(12) United States Patent
Ferraz

(10) Patent No.: US 8,820,680 B2
(45) Date of Patent: Sep. 2, 2014

(54) LANDING GEAR MECHANISM FOR AIRCRAFT

(75) Inventor: Mario Sergio Dias Ferraz, São José dos Campos (BR)

(73) Assignee: Embraer S.A., São José dos Campos—SP (BR)

( * ) Notice: Subject to any disclaimer, the term of this patent is extended or adjusted under 35 U.S.C. 154(b) by 478 days.

(21) Appl. No.: 13/001,976

(22) PCT Filed: Jun. 30, 2009

(86) PCT No.: PCT/BR2009/000194
§ 371 (c)(1),
(2), (4) Date: Apr. 1, 2011

(87) PCT Pub. No.: WO2010/000051
PCT Pub. Date: Jan. 7, 2010

(65) Prior Publication Data
US 2011/0174924 A1    Jul. 21, 2011

(30) Foreign Application Priority Data
Jun. 30, 2008   (BR) ...................................... 0802166

(51) Int. Cl.
*B64C 25/10*    (2006.01)

(52) U.S. Cl.
USPC .................................................... 244/102 A

(58) Field of Classification Search
USPC ..... 244/100 R, 102 R, 102 A, 102 SS, 103 R, 244/104 R
See application file for complete search history.

(56) References Cited

U.S. PATENT DOCUMENTS

| | | | | |
|---|---|---|---|---|
| 1,600,154 A | * | 9/1926 | Van Vliet | 244/104 R |
| 2,487,548 A | * | 11/1949 | Hawkins, Jr. | 244/102 R |
| 2,578,200 A | * | 12/1951 | Nicholl | 244/104 R |
| 2,579,180 A | | 12/1951 | Eldred | |
| 2,811,326 A | * | 10/1957 | Westcott, Jr. | 244/102 R |
| 2,863,623 A | * | 12/1958 | Lebold | 244/102 R |
| 2,930,552 A | * | 3/1960 | Hartel | 244/103 R |
| 2,960,289 A | * | 11/1960 | Westcott, Jr. | 244/104 R |
| 3,338,535 A | * | 8/1967 | Lucien | 244/102 R |
| 3,533,581 A | * | 10/1970 | Leclercq | 244/104 R |
| 3,544,043 A | * | 12/1970 | Stratford | 244/104 R |

(Continued)

FOREIGN PATENT DOCUMENTS

| | | |
|---|---|---|
| EP | 1 279 591 | 1/2003 |
| FR | 2 646 219 | 10/1990 |

OTHER PUBLICATIONS

International Search Report for PCT/BR2009/000194, mailed Oct. 29, 2009.

*Primary Examiner* — Rob Swiatek
*Assistant Examiner* — Timothy Schwarz
(74) *Attorney, Agent, or Firm* — Nixon & Vanderhye P.C.

(57) ABSTRACT

Landing gear mechanism for aircraft are provided which include first and second connecting arms and front and rear wheels operatively associated with the first and second connecting arms, respectively. A balance beam element is indirectly linked to the front and rear wheels through each one of the connecting arms and shock absorber elements, respectively, so that the front portion of the balance beam element is associated with the first portion of the first shock absorber element. A positioning damper element is hingedly connected to the aircraft structure and also connected, directly or indirectly, to a portion of the body of the balance beam element.

27 Claims, 14 Drawing Sheets

(56) References Cited

U.S. PATENT DOCUMENTS

| | | | |
|---|---|---|---|
| 3,556,440 A * | 1/1971 | Lallemant | 244/104 R |
| 3,559,925 A * | 2/1971 | Costigan et al. | 244/50 |
| 4,155,522 A * | 5/1979 | Sealey | 244/102 R |
| 4,402,477 A | 9/1983 | Turiot et al. | |
| 4,422,604 A | 12/1983 | Turiot et al. | |
| 4,681,284 A * | 7/1987 | Veaux et al. | 244/102 R |
| 5,613,651 A * | 3/1997 | Meneghetti | 244/50 |
| 6,173,920 B1 * | 1/2001 | Meneghetti | 244/100 R |
| 7,007,891 B2 | 3/2006 | Ducos et al. | |
| 2005/0011991 A1 * | 1/2005 | Ducos et al. | 244/102 R |
| 2010/0237188 A1 * | 9/2010 | Genty De La Sagne et al. | 244/102 R |

* cited by examiner

LANDING GEAR MECHANISM FOR AIRCRAFT

This application is the U.S. national phase of International Application No. PCT/BR2009/000194 filed 30 Jun. 2009, which designated the U.S. and claims priority to Brazil Application No. PI 0802166-0 filed 30 Jun. 2008, the entire contents of each of which are hereby incorporated by reference.

FIELD OF INVENTION

The present invention relates to a landing gear mechanism for use in aircraft, preferably for retractable landing gears, which allows to be retracted on the fuselage of the same, whose use is required in aircrafts for cargo transportation.

BACKGROUND OF THE INVENTION

Existing landing gears used in freight aircraft have a robust structure to support, at the time of landing, the high impact loads on the ground, especially those landings on unprepared runways, whose ground is irregular. Such structures are based on independent sets of arms to support the wheels, said arms being attached to the fuselage of the aircraft and offering complex and not so effective embodiments, because of the independence of movement of the arms.

In this sense, the difficulty that the aircraft faces on landing on runways with irregular ground, particularly freight aircraft, is true, because the structures of the existing landing gears, particularly the arms to support the wheels, are not synchronized with its motion because of the independence of their movement.

These structures can be better understood in the prior art documents presented below.

DESCRIPTION OF THE PRIOR ART

The state of the art includes some patent documents related to landing gears and thus the technique that is being used for this type of structure is well known.

The European document EP 1279591 A1, of Jun. 26, 2002, filed by Messier-Dowty S. A., describes an undercarriage which consists of a number of legs in a line parallel to the aircraft's median lengthwise axis, with a pair of wheels on the lower end of each arm. Each leg comprises a tubular body fixed to the aircraft structure, with a balance arm placed on the axis at its lower end, and a shock absorber placed on the axis between a portion on the balance arm and a slider inside the tubular body. Said slider is connected to an actuating power cylinder by links at the top of the tubular body so that it is moved axially between two positions of said undercarriage, which correspond to the undercarriage being retracted and extended.

The US document U.S. Pat. No. 7,007,891 B2, of Jul. 1, 2004, also filed by Messier-Dowty S. A., relates to a retractable landing gear for an aircraft. Said landing gear comprises a plurality of independent legs, each leg comprising a structural part rigidly secured to a structure of the aircraft, a beam that rotates on an axis of the balance beam supporting a pair of wheels, and a shock absorber. In accordance with such US document, the shock absorber of each leg is extended by a positioning portion enabling the total length of the extended shock absorber to be shortened in order to collapse said leg. Each leg further comprises a positioning actuator connected in hinged manner to the extended shock absorber and arranged to lengthen relative to a normal use position in order to lengthen the corresponding leg. This makes it possible to shorten and/or lengthen one or another of the legs of the landing gear while the aircraft is stationary or taxiing slowly.

The document WO 2007/015104 A1, of Aug. 4, 2006, which was filed by Messier-Dowty Limited, relates to a semi-elevated landing gear for an aircraft, which comprises a main support of the shock absorber connected to the fuselage; a beam of the chassis extending fore and aft of the fuselage with forward and aft wheels; a connecting pivot responsible for the hinging of the chassis and of the main support and an auxiliary actuator, connected between the support and the front portion of the chassis beam at an auxiliary pivot. The auxiliary actuator comprises a two stage telescopic hydraulic unit, said auxiliary actuator comprising a piston and an actuator of the first stage cylinder and piston and an actuator of the a second stage cylinder, which operates coaxially within an outer casing. Each respective piston rod extends from each end of the structure and is connected to a respective one of said supports of the chassis beam. The first stage actuator is operable at an extended position, and the second stage actuator is operable at a retracted position. An extended position defined by respective end stops within the outer casing, serves to control the tilt position of the chassis relative to the support. The second stage actuator, when in the retracted position, with the first stage actuator in the extended position, limits the length of the auxiliary actuator between its connections, of the support and of the chassis, so as to assume a predetermined intermediate length in which the chassis beam is restrained to tilt on the auxiliary pivot and thereby lengthens the landing gear during take-off. The second stage actuator, when in the extended position, with the first stage actuator in the extended position, allows the length of the auxiliary actuator to assume a predetermined maximum length so that the chassis beam is tilted on the main pivot to allow a stowing position for stowing the landing gear in the aircraft.

The document WO 2004/069652 A1, of Dec. 29, 2003, also filed by Messier-Dowty S. A., refers to an aircraft vertically retractable landing gear, comprising a plurality of independent supports, each support comprising a structural component rigidly secured to an aircraft structure, an arm of a balance beam that rotates on an axis and a damper. The invention is characterized in that each support further comprises a positioning actuator hingedly coupled to the damper, the whole assembly being interposed between an appendix of the balance beam arm and a mobile element forming part of the landing gear maneuvering linkage. A link rod is interposed between the balance beam arm and the hinge point between the positioning actuator and the damper. The positioning actuator is designed to be shortened and/or lengthened for collapsing or extending the support concerned, when the aircraft is stopped or slowly moving along the ground.

In analyzing the mentioned prior art, one can infer that the landing gear of the document U.S. Pat. No. 7,007,891 B2 has the following disadvantages over the object of the present invention:

a) it has an independent set for each leg, which is fixed to the aircraft structure;

b) each leg comprises a positioning actuator;

c) the landing gear does not have a structure that provides a synchronized movement of the balancing efforts between the front and rear wheels for landing on runways whose grounds are irregular and not prepared;

d) overload in certain parts of the set; and e) complex control circuits in dampers and positioning actuators.

With respect to documents EP 1279591 A1 and WO 2004/069652 A1, as the technical characteristics of the respective landing gears are very similar to the technical features of the landing gear of the document U.S. Pat. No. 7,007,891 B2, the drawbacks presented by these landing gears are practically the same presented above for the US document under reference. Finally, as to the embodiment of the landing gear disclosed in the document WO 2007/015104 A1, it is commonly used in large aircrafts, and further has as its main characteristic the use of only one shock absorber device for each pair of wheels, thus overloading said device in case of landing.

Moreover, none of the prior art documents has a landing gear whose structure is provided with a mechanism that allows the wheels to fit the irregular ground of runways on unprepared grounds.

In order to solve the problems faced by the prior art documents, the present invention presents a landing gear mechanism for aircraft, preferably cargo aircraft. This mechanism comprises a hinged structure comprising a balance beam element, referred as balance beam, and at least one pair of wheels. In order to make the landing gear retractable into the aircraft structure, said balance beam is connected to a locking arm, which in turn is interconnected to a maneuvering actuator device connected to the aircraft structure. Each wheel is connected to a connecting arm, which is connected to a shock absorber element, which in turn is connected to the balance beam. It is also foreseen a positioning damper element hingedly connected in its ends to a balance beam portion and to the aircraft structure.

Alternatively to the preferred embodiment of the present invention, it is provided an arrangement of at least one shock absorber element and a fixed bar in replacement to the second shock absorber element.

This hinged structure which comprises the landing gear, allows the use of multiple wheels using a single maneuvering actuator and only one positioning damper element, providing the correct positioning of the wheels on the ground and an adequate distribution of the load on the respective wheels.

Furthermore, with regard to the existing landing gears for cargo aircraft, it should be noted that the mechanism of the present invention has the following advantages:
  considerable reduction of lateral vibration of the wheels (shimmy instability) in view of the fact that the sets of connecting arms, shock absorber device and wheels operate aligned with the take-off direction, so that at landing, take-off and taxiing the connecting arms operate under traction;
  reduction of overload in landings. When the landing gear is ready for the landing of the aircraft, the balance beam element is positioned in a tilted form, thereby positioning the rear wheel lower than the front wheel. Thus, the rear wheel always touches the ground before the front one. This reduces the efforts that occur in the landing gear itself and in the aircraft structure;
  better positioning of the landing gear wheels relative to the gravity center of the aircraft due to the indirect connection between said wheels through the balance beam, shock absorber elements and connecting arms. In this case, such positioning is not dependent on a particular wheel, but according to the center of the balance beam. This best positioning of the wheels relative to the gravity center of the aircraft also increases the distance of the aircraft gyro point until the horizontal empennage, thus allowing the use of an horizontal empennage with a smaller area;
  better distribution of load between the landing gear wheels, as well as avoiding overloading in the landing gear;
  conditions for operating on unprepared and semi-prepared runways, with irregular grounds; and
  in the operation of the aircraft in a prepared ground, that is, in a plain ground, the balance beam provides the positioning of the two wheels on the same level.

SUMMARY OF INVENTION

In the landing gear mechanism of the present invention, each of the front and rear wheel is connected to a portion of the respective connecting arm. To this portion of the connecting arm, the shock absorber element is also associated, which in turn is also connected to the balance beam. In the aircraft structure, another portion of said connecting arm is connected. It is also foreseen a positioning damper element hingedly connected at its ends to a portion of the balance beam and to the aircraft structure. Each sub-set, which comprises at least one wheel, a connecting arm and a shock absorber element, is in turn indirectly connected by the balance beam to another sub-set further comprising at least one wheel, a connecting arm and a shock absorber element. The hinged movement of retracting and extending the structure of the landing gear set may be carried out by a maneuvering actuator device, with one of its ends being connected to the hinged locking arm and its other end connected to the aircraft structure. Said locking arm is connected to a central portion of the balance beam. In turn, said balance beam, in its upper central portion, is indirectly connected to the aircraft structure through a collecting arm (or collecting bar), which acts so as to guide the movement of said balance beam. The positioning damper element, which is disposed between the balance beam and the aircraft structure, cooperates in damping the assembly and ensuring the correct positioning of the wheels at the time of landing.

This set of wheels, shock absorber elements and connecting arms operatively cooperates with the balance beam, which makes said elements work in synchronism. That is, when a wheel goes down the other goes up and vice-versa. Due to the fact that shock absorbers are indirectly connected by the balance beam, the strokes of the front and rear shock absorbers are summed, thereby ensuring the high efficiency of the damping set. This creates an interdependence between the front and rear wheels. Such interdependence ensures a balanced load distribution between the two wheels, regardless of any irregularities in the ground.

DESCRIPTION OF FIGURES

The present invention will be described based on the attached figures, in which.

DETAILED DESCRIPTION OF THE INVENTION

Figure 1:
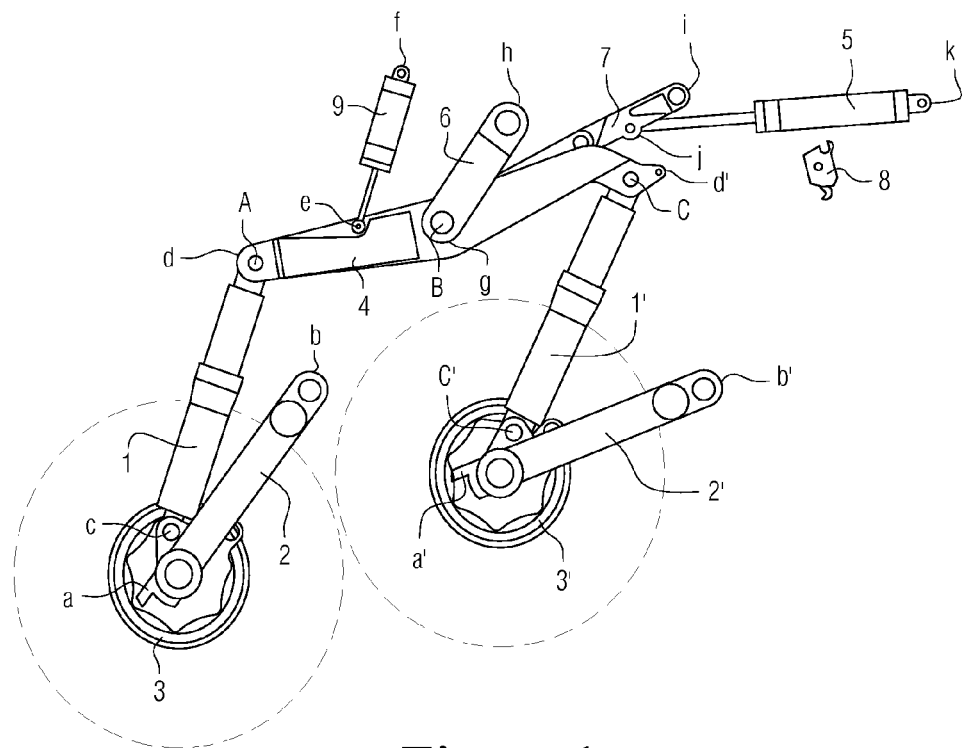
FIG. 1 shows a side view of the extended landing gear of the present invention.

To better understand the main embodiment of the present invention and its respective alternative forms, the same numerical references will be used to indicate common elements in such embodiments. It should be noted that the term "aircraft structure" with its respective reference number (10) will be used to refer, in a general form, to the structural elements, such as the supports and fuselage, to which the landing gear mechanism is connected and which are not part of the present invention.

The present invention relates to a landing gear mechanism for use in aircraft, mainly for cargo transportation, with a retractable landing gear system in the fuselage, of the sponsom type or any other type of landing gear bay.

FIGS. 1 to 4 show the embodiment designed for the landing gear mechanism of the present invention. This mechanism may be provided with at least two wheels, a front wheel and a rear wheel in the flight direction.

The following description better describes the landing gear mechanism for aircraft, preferably cargo aircraft, comprising a retractable and hinged structure equipped with a balance beam element (4), called balance beam, indirectly connected to at least a pair of rear wheels (3) and front wheels (3') and connected to a hinged locking arm (7), which is in turn interconnected to a maneuvering actuator device (5), whose upper end (k) is connected to the aircraft structure. Each wheel (3) and (3') is indirectly linked to the balance beam element (4), through each connecting arm (2) and (2') and each shock absorber element (1) and (1'), respectively.

Figure 3:
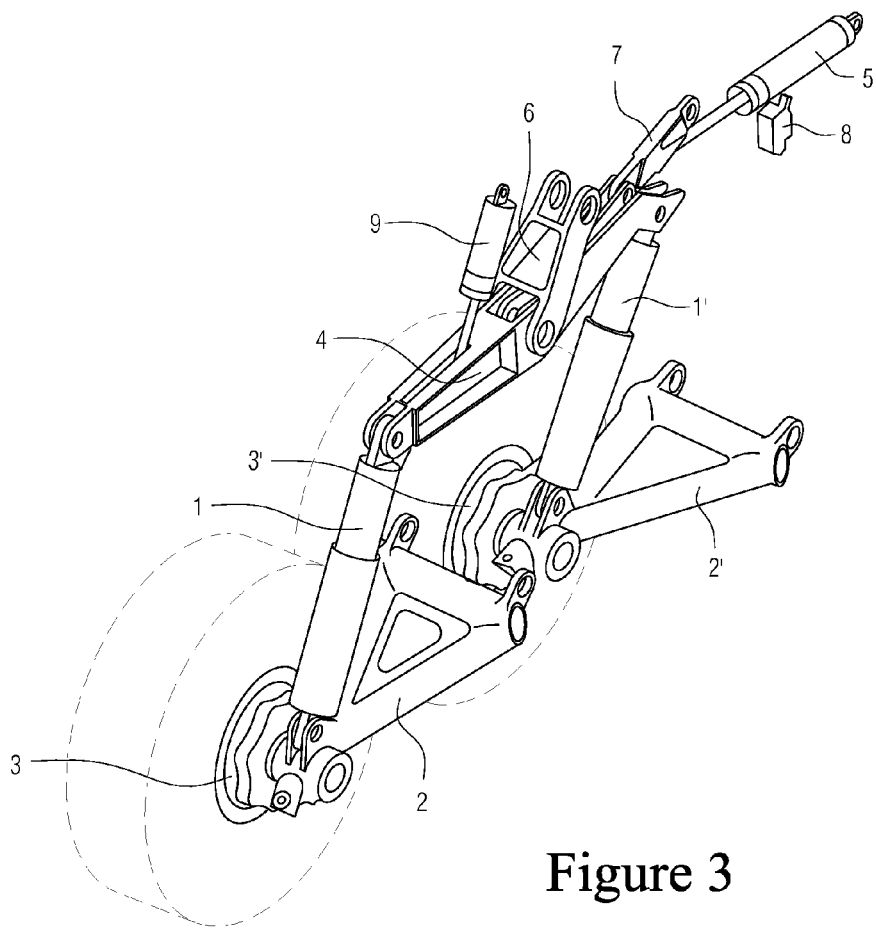
FIG. 3 shows a perspective view of the extended landing gear of the present invention.
Figure 4:
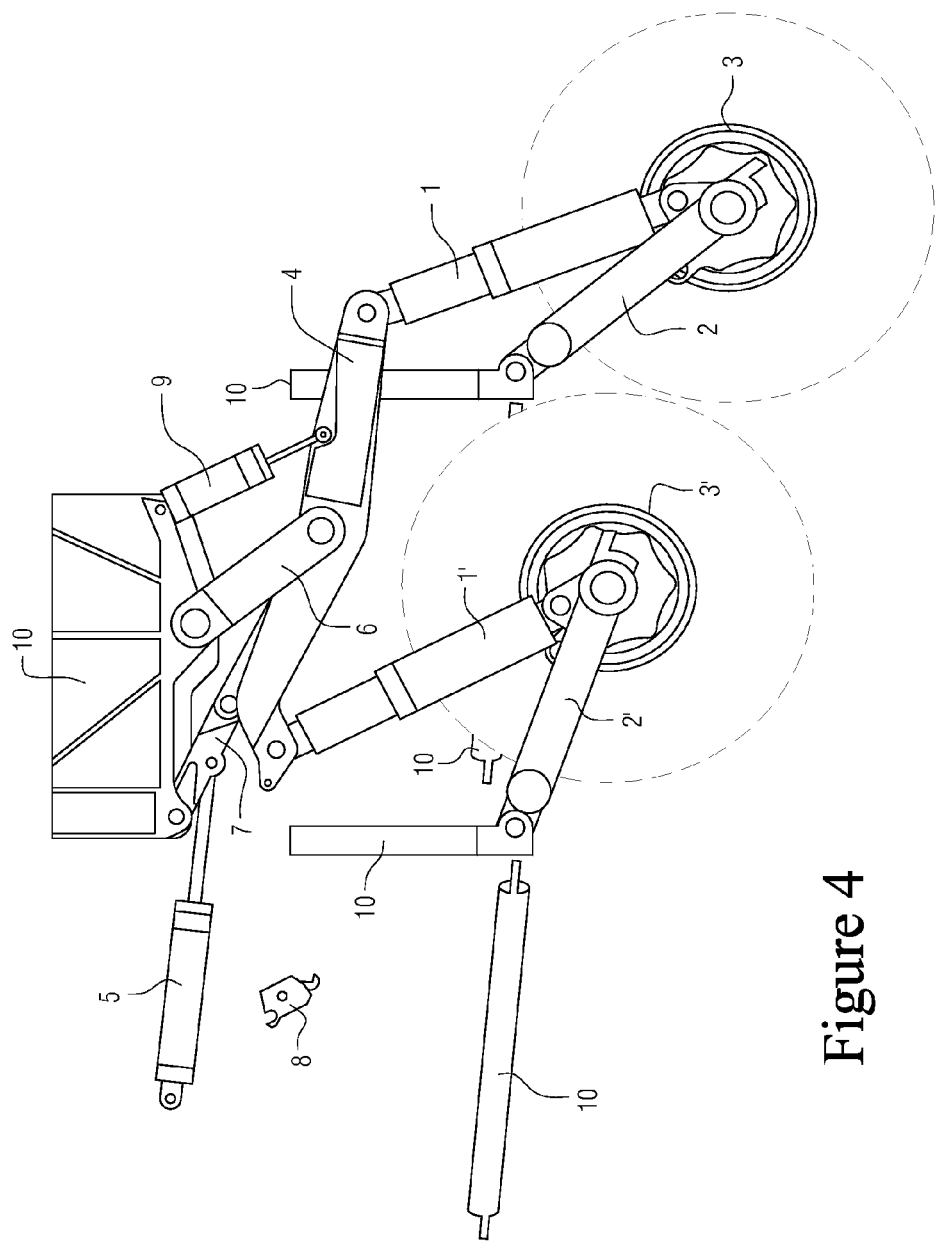
FIG. 4 shows an inverted side view of the extended landing gear of the present invention.

According to FIGS. 1, 3 and 4, a portion located in the region (a) of the rear connecting arm (2) is connected to the rear wheel (3). The end (b) of the rear connecting arm (2) is hingedly connected to the aircraft structure (10).

Similarly, a portion located in the region (a') of the front connecting arm (2') is connected to the front wheel (3'). The end (b') of the front connecting arm (2') is hingedly connected to the aircraft structure (10).

With respect to FIG. 1, the end (c) of the rear shock absorber element (1) is hingedly connected to a portion located in the region (a) of the rear connecting arm (2). The end (d) of the rear shock absorber element (1) is hingedly connected to the rear end A of the balance beam element (4).

Following the same reasoning, the end (c') of the front shock absorber element (1') is hingedly connected to a portion located in the region (a') of the front connecting arm (2'). The end (d') of the front shock absorber (1') is hingedly connected to the front portion of said balance beam (4), particularly in an extension of the coupling (C) next to its front end. Said coupling (C) extension couples in the locking device (8), preferably of the lock up box type, comprising, therefore, a locking system when said landing gear is in the retracted position in the aircraft fuselage. Said front end (C) of the balance beam (4) has a geometry that allows such locking. When the landing gear is in the extended position, as in FIG. 1, the locking is carried out by the locking arm (7), which is provided in its upper portion with a locking spring responsible for maintaining the locking as well as the correct positioning of the two semi-arms of said arm (7). The balance beam (4), by its ends A and C, indirectly and hingedly links the two shock absorbers (1, 1'), respectively.

Alternatively, the maneuvering actuator (5) may have an internal locking device that is activated when the landing gear is extended, comprising, therefore, an additional locking besides the one provided by the locking arm (7).

As in FIGS. 1, 2, 3 and 4, the retracting arm (6) has its end (h) hingedly connected to the aircraft structure (10) and, its end (g) hingedly connected to the central portion (B) of the balance beam (4) with the purpose of guiding the balance beam (4) during its retracting and extending movement of the sub-sets of wheels (3, 3'), shock absorbers (1, 1') and connecting arms (2, 2').

Figure 2:
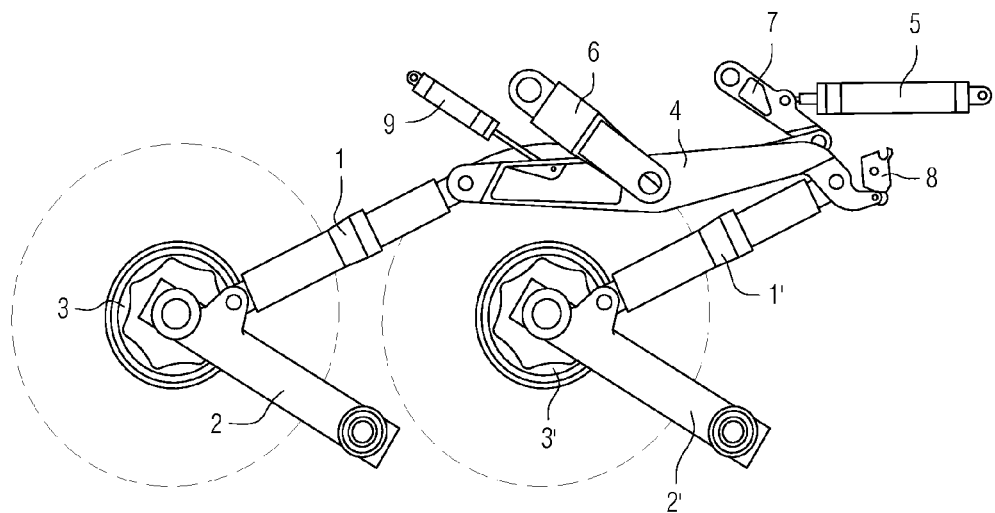
FIG. 2 shows a side view of the retracted landing gear of the present invention.

As shown in FIGS. 1 and 2, and also in FIGS. 3 and 4, the geometry of the balance beam (4) was designed to allow the connection of components that are hingedly linked to the same, thus allowing the locking of the front end (C) of the balance beam (4) together with the locking device (8), as well as avoiding interference with the front shock absorber (1') when the landing gear is in the retracted position. Thus, the geometry obtained at the top (C) of the balance beam (4), besides allowing the hinged connections of upper components, but not essential to the embodiment of the invention, also prevents interference with the locking arm (7) and with the maneuvering actuator (5). As in FIG. 3, said locking arm (7) is inwardly hinged to the balance beam (4) and the retracting arm (6) is outwardly hinged to the balance beam (4). However, these are structural aspects which may be differently implemented, provided that the same technical effect to the landing gear is obtained.

As shown in FIG. 1, and also in FIGS. 2, 3 and 4, based on the geometry of the balance beam (4), said hinging points (A), (B) and (C) of said balance beam (4), which connect to the upper ends (d, d') of said shock absorbers (1, 1') and said lower end (g) of the locking arm (7) and the retracting arm (6), are equidistantly positioned and aligned with respect to each other.

During the retracting or extending of the landing gear, the balance beam (4) makes a semi-rotating movement around its hinging point with the retracting arm (6) and simultaneously performs shifting movement, forward in the retracting movement, or backward in the extending movement relative to the horizontal plane. That is, the balance beam (4) promotes a translation movement with regard to the hinging axis (B).

Still in an alternative form, the balance beam (4), by its ends A and C, indirectly and hingedly, links at least the shock absorber (1) and a fixed bar, respectively.

With respect to FIGS. 1 and 4, the positioning damper element (9) comprises an end (f) hingedly connected to the aircraft structure (10) and the end (e) of its moving rod is hingedly connected to a portion of the balance beam's body (4), said rod being disposed between the center and rear end of said balance beam's body (4). The tilt of said balance beam (4) is limited by said positioning damper actuator (9), whose basic purpose is to cooperate in the damping of the landing gear, as well as to ensure the correct positioning of the tilt of the balance beam (4).

FIGS. 1, 2, 3 and 4, more particularly FIG. 2, show that the locking arm (7) is a hinged element, comprising two semi-arms joined by a hinged connection, which provides hinging of said arm (7) when requested by the maneuvering actuator device (5). As can be seen in FIGS. 1 and 4, said arm (7) has its end (g) of its lower semi-arm hingedly connected to the central region (B) of the balance beam (4) and its end (i) of its upper semi-arm is hingedly connected to the aircraft structure (10). Further, as it is more evident in FIG. 2, the central part of the upper semi-arm of said arm (7) is hinged to the end (j) of the moving rod of the maneuvering actuator device (5).

The referred landing gear, in the extended position, as in the side view of FIG. 1 and the inverted view of FIG. 4, shows the balance beam (4) in a tilted position relative to the horizontal plane, so that its rear end is in a lower position relative to the front end, thus causing the rear wheel (3) to be in a lower level relative to the front wheel (3').

After the completion of the aircraft take-off operation, the retracting of the landing gear mechanism, according to FIG. 2, occurs when the maneuvering actuator (5) makes the movement for retracting its rod, whose motion is transmitted to the upper semi-arm of the locking arm (7), which in turn promotes an action on its lower semi-arm, thereby causing a translation movement of the balance beam (4), which suspends the shock absorbers (1, 1') so that said shock absorbers (1, 1') could promote the retracting of the connecting arms (2, 2') and wheels 3 and 3' into the fuselage.

Further, with respect to FIG. 2, said balance beam (4) transmits movement to the positioning damper element (9) and to the retracting arm (6), so that they turn around their hinging points in the balance beam (4). This movement occurs gradually and simultaneously, thereby promoting the retracting of the two sub-sets comprised by the arms (2, 2'), wheels (3, 3') and shock absorbers (1, 1').

Similarly, the extending operation of the landing gear mechanism occurs from the extending movement of the maneuvering actuator rod (5), as in FIGS. 1, 3 and 4.

As already mentioned, the components of the mechanism of the present invention are disposed so that when said landing gear is in landing position, the rear wheel (3) is positioned in a lower level relative to the front wheel (3'), so that said rear wheel (3) always touches the ground before the front one (3'), thus allowing further optimization of the landing load, which rotates the rear and front sets of wheel, tire and brake always with a time delay, and consequently, reduces the efforts on the landing gear and in the aircraft structure (10).

Figure 5:
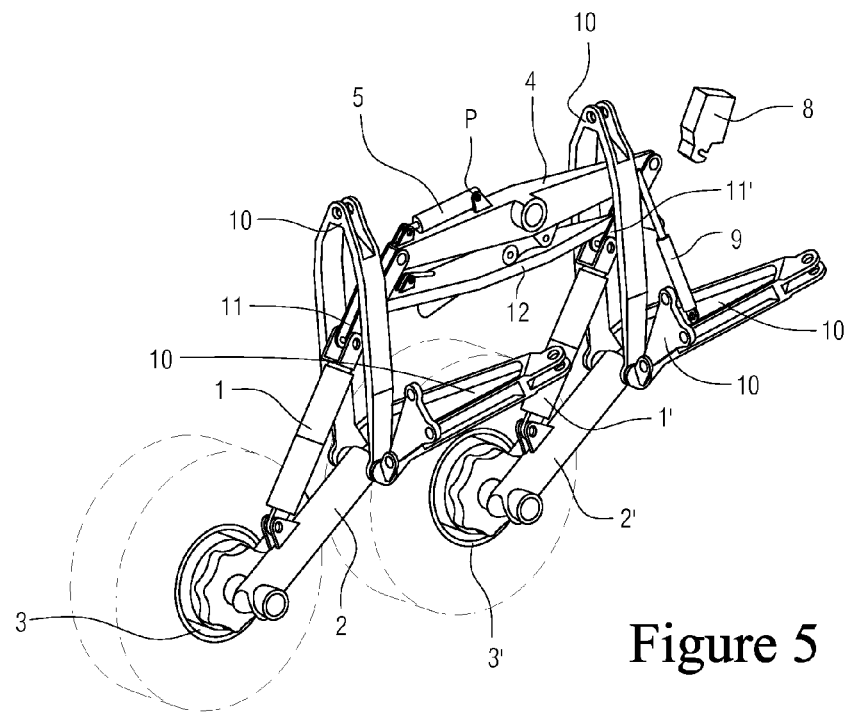
FIG. 5 shows a perspective view of the extended landing gear according to the second embodiment of the present invention.
Figure 6:
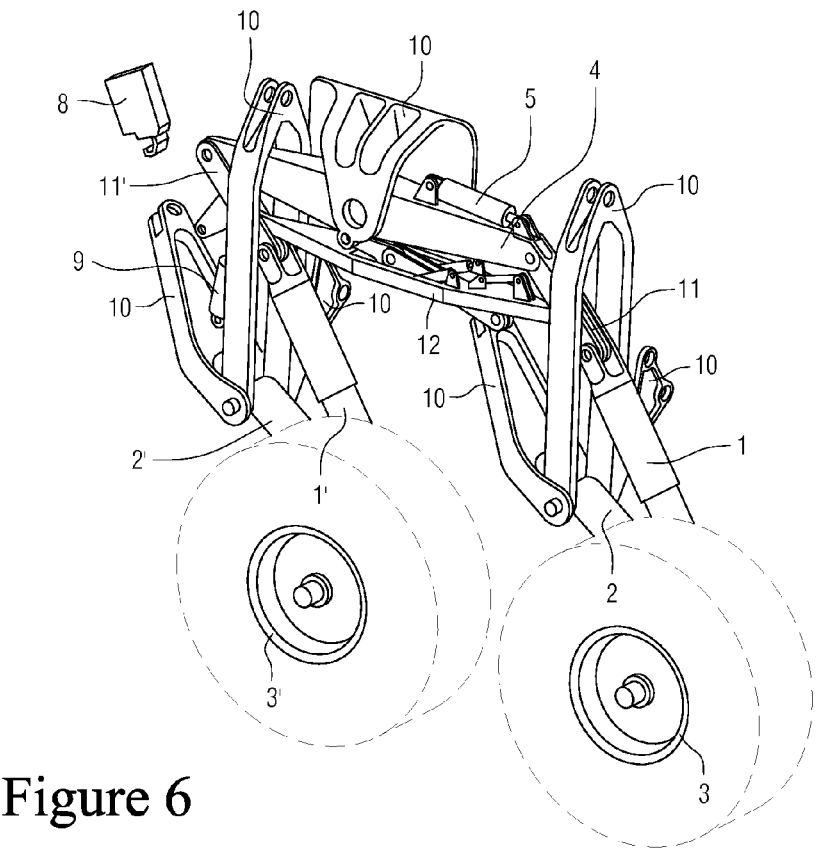
FIG. 6 shows an inverted perspective view of the extended landing gear according to the second embodiment of the present invention.
Figure 7:
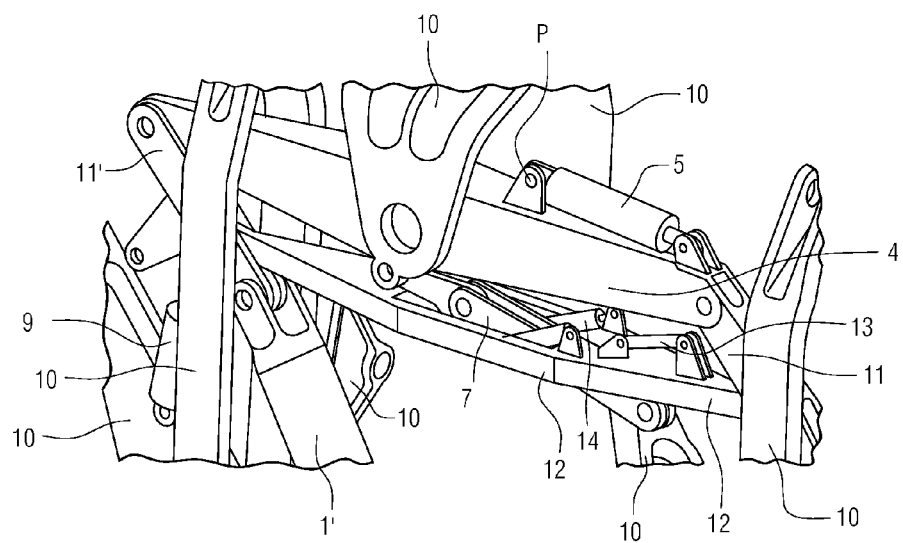
FIG. 7 shows a detailed view of the upper region of the landing gear structure of the second embodiment of the present invention, based on FIG. 6.

FIGS. 5 to 7 show a second embodiment, designed for the present invention. In this embodiment, the maneuvering actuator 5 comprises one hinged end (p), which is connected to an upper part of the balance beam (4). The other end of the maneuvering actuator (5) is hingedly connected to the upper part of the rear bellcrank (11). The rear bellcrank (11) is indirectly and hingedly connected to the frontal bellcrank (11') by a connecting bar (12), which is disposed below and parallel to the balance beam (4). The rear and front bellcranks (11, 11') indirectly and hingedly link the balance beam (4) to the rear and front shock absorbers (1, 1'), respectively.

In addition, in this configuration the central part of the balance beam (4) is hingedly connected to the aircraft structure (10). Thus, the balance beam (4) does not promote a back and forth movement with respect to the horizontal plane, but only semi-rotation movements. The positioning damper element (9) interconnects the front bellcrank (11') to the aircraft structure (10).

The main function of the bellcranks (11) and (11') is to transmit to the shock absorbers (1) and (1') the movements which are necessary for retracting and extending the landing gear.

As in FIG. 7, in this embodiment, the locking arm (7) is positioned below the balance beam (4). This embodiment further has the unlocking actuator (13) and locking spring (14) elements, which are considered accessory elements of the locking system.

FIGS. 8 to 12 show a third embodiment designed for the present invention. Said embodiment also comprises a first front sub-set formed by a connecting arm (2'), at least one wheel (3') and a shock absorber (1'); and a rear sub-set formed by a connecting arm (2), at least one wheel (3) and a shock absorber (1). These two sub-sets are connected by the balance beam (4). The elements of these sub-sets and the balance beam (4) are arranged in the same way as in the first embodiment of the present invention. Its main feature is the arrangement of its components for locking and driving the landing gear. According to FIG. 8, in the extended position, the landing gear shows in its central region a locking arm (7) formed by the semi-arms (7a), (7b), (7c), (7d) and (7e), which are hinged to each other. At the moment when the landing gear is in the extended position, said arms are arranged so that the first end of (7a) is angularly connected to the first end of (7b); the second end of (7b) is angularly connected to the first end of (7c); the second end of (7c) is connected in a straight and locked manner to the first end of (7d); and the second end of (7d) is angularly connected to the second end of (7a). The locking between (7c) and (7d) is performed with the aid of a spring and/or any other locking means. Moreover, at the connection point P1, there is simultaneously the hinged connection between the second end of the semi-arm (7d), the second end of the semi-arm (7a) and the first end of the semi-arm (7e). Even when the landing gear is in the extended position, as in FIGS. 8 and 9, the bisectrix that begins at the vertex formed by the semi-arms 7a and 7b is a line parallel to the shock absorber 1 and 1', and the tilt of the semi-arm (7e), as in FIGS. 8 and 9, with regard to an imaginary line passing through the point P1 and parallel to the longitudinal axis of the balance beam (4) has an angle between 270° and 360°.

Figure 9:
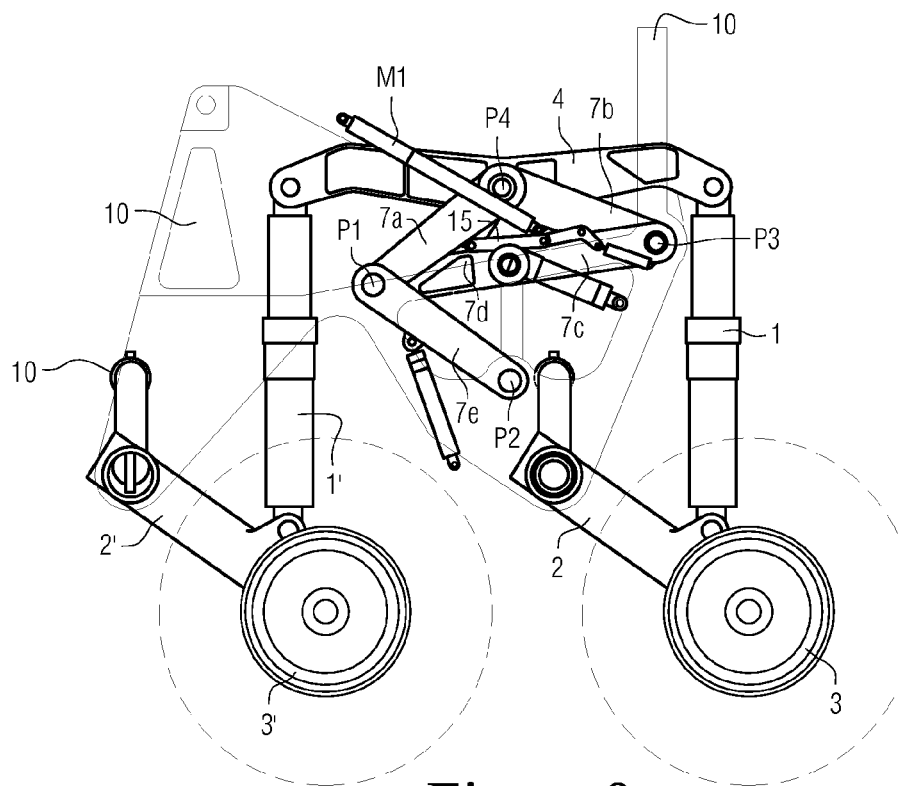
FIG. 9 shows an inverted side view of the extended landing gear, comprising four wheels and showing the aircraft structure, according to the third embodiment of the present invention.

According to FIG. 9, the second end of the semi-arm (7e) is hingedly connected to the aircraft structure (10) at the point P2.

Similarly, at the connection point P3, there is simultaneously the hinged connection between the second end of the semi-arm (7b), the first end of the semi-arm (7c) and the aircraft structure (10).

At the connection point P4, there is simultaneously the hinged connection between the first end of the semi-arm (7a), the first end of the semi-arm (7b) and the center of the balance beam (4).

Figure 8:
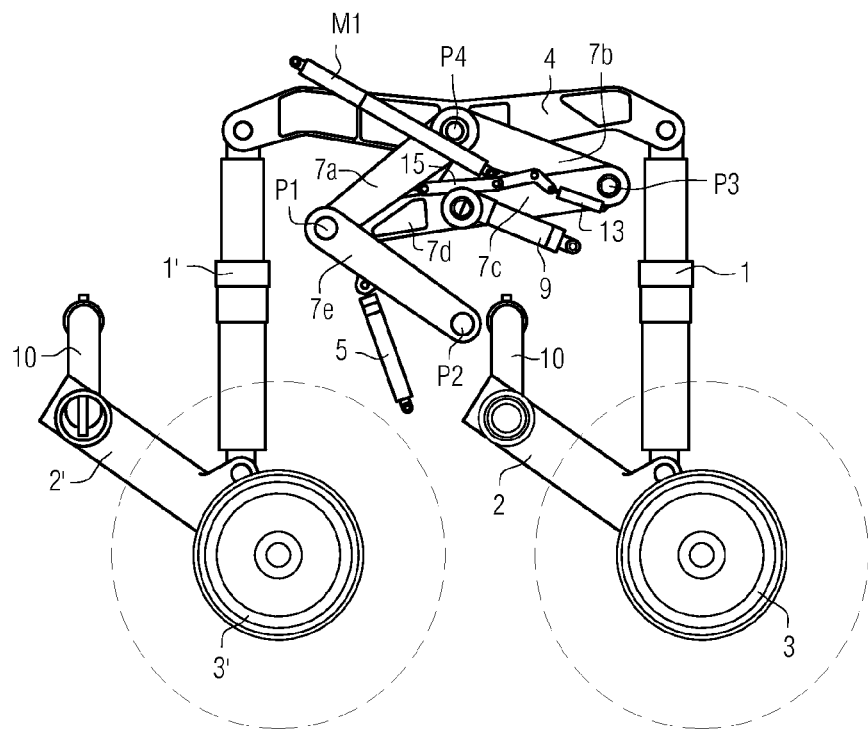
FIG. 8 shows an inverted side view of the extended landing gear of the third embodiment of the present invention comprising four wheels.
Figure 10:
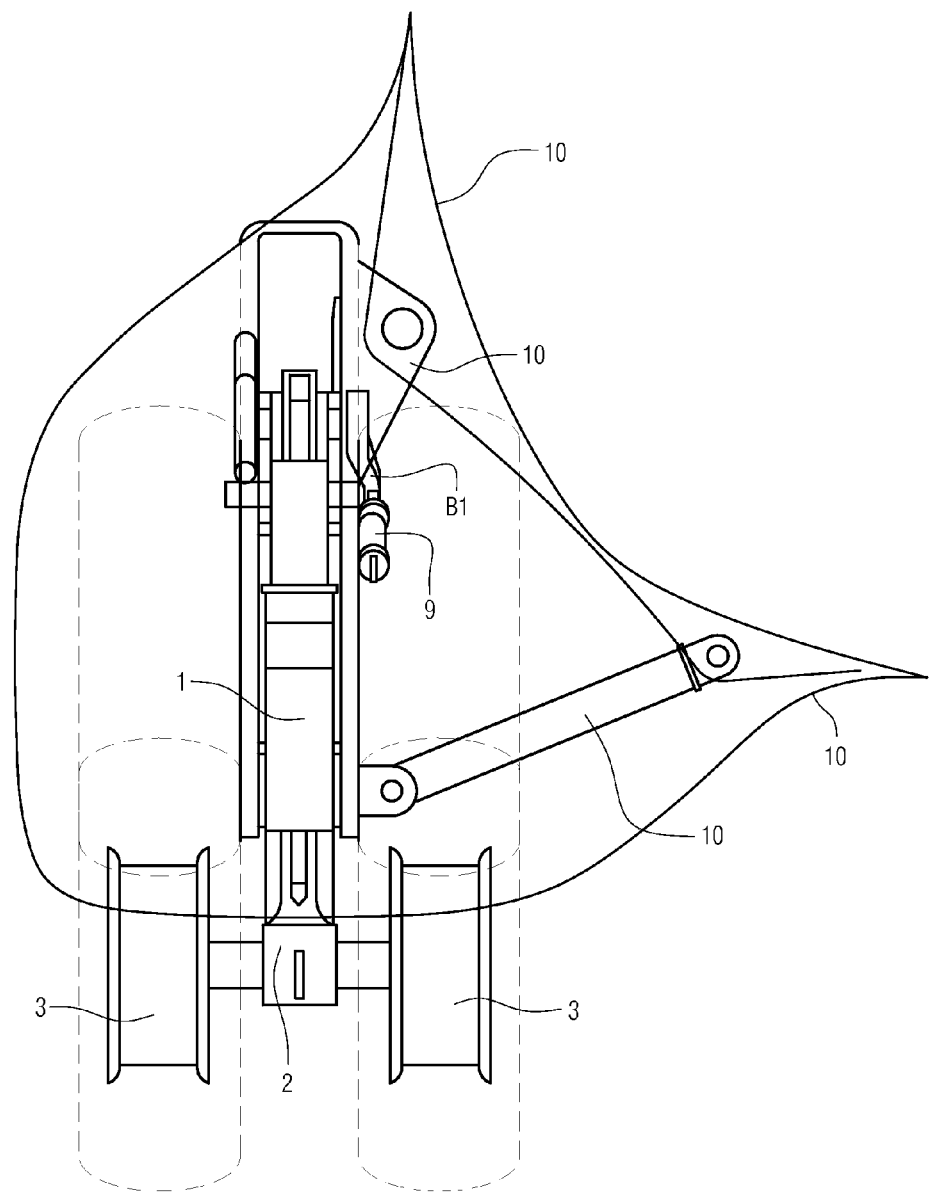
FIG. 10 shows a rear view of extended landing gear, comprising four wheels and showing the aircraft structure, according to the third embodiment of the present invention.

As it can be seen in FIGS. 8 and 9, the maneuvering actuator (5) has its first end hingedly connected to the semi-arm (7e) and its second end hingedly connected to the aircraft structure (10). As shown in FIG. 10, the positioning damper element (9) has its second end hingedly connected to the aircraft structure (10) and its first end hingedly connected to the semi-arm (B1), which in turn is connected to the balance beam (4).

Figure 11:
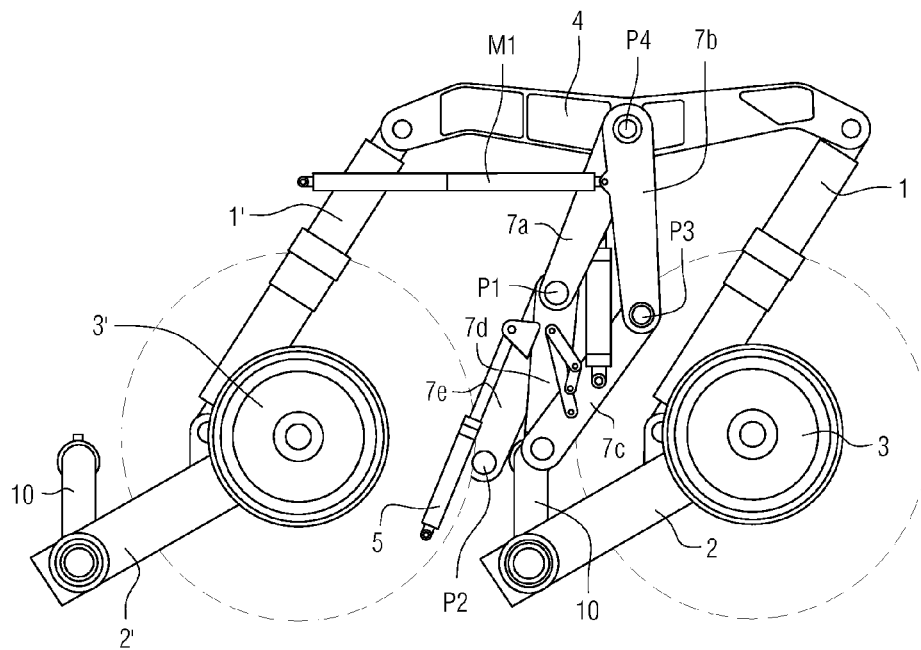
FIG. 11 shows an inverted side view of the retracted landing gear of the third embodiment of the present invention comprising four wheels.
Figure 12:
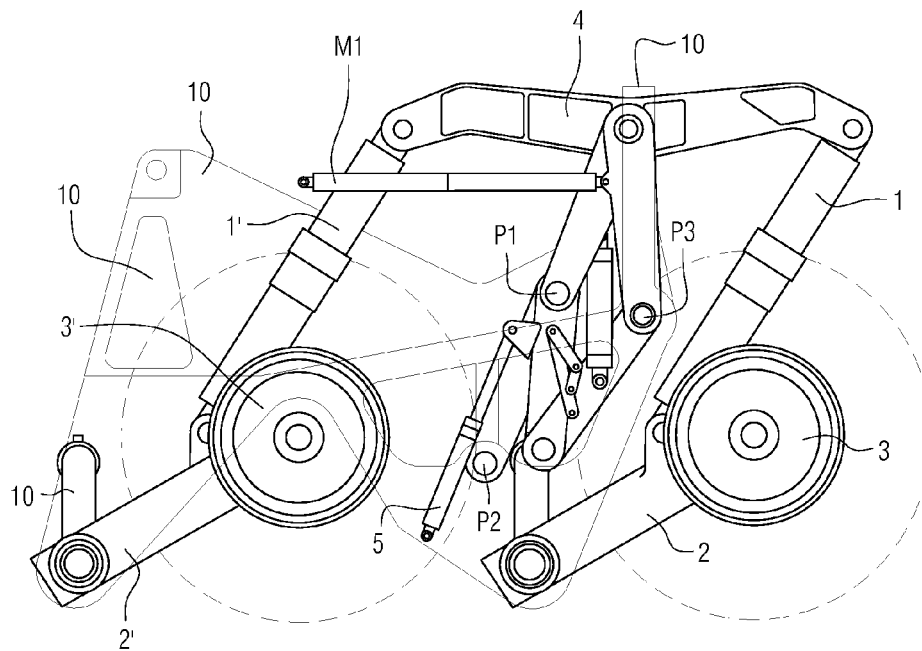
FIG. 12 shows an inverted side view of the retracted landing gear, comprising four wheels and showing the aircraft structure, of the third embodiment of the present invention.

FIG. 8 shows the unlocking actuator (13) and the unlocking arm (15). In order to initiate the retracting of the landing gear, the unlocking actuator (13) is activated, which activates the unlocking arm (15), which in turn unlocks the existing locking due to the alignment between the semi-arms (7c) and (7d). Then, the maneuvering actuator (5) is activated causing the extension of its rod, which leads the whole assembly to achieve a synchronized movement until reaching the retracted position, which is shown in FIGS. 11 and 12.

In the retracted position, the locking of the whole assembly is made by the alignment between the semi-arms (7e) and (7a), with the aid of a spring or other locking means.

Starting from the retracted position to the extended position, the movement is also performed by the maneuvering actuator (5) through the retraction of its rod, which causes a synchronized movement of the other components. As in FIG. 8, the free-fall spring (M1) comprises an encapsulated spring, which is used in an emergency to make the extension of the landing gear.

FIGS. 13 to 17 show a fourth embodiment designed for the present invention. Said embodiment further comprises a first front sub-set formed by a connecting arm (2'), at least one wheel (3') and a shock absorber (1'), and a rear sub-set formed by a connecting arm (2), at least one wheel (3) and a shock absorber (1). These two sub-sets are connected by the balance beam (4). The elements of these sub-sets and the balance beam (4) are disposed in the same way as in the first embodiment of the present invention.

Its main feature is the arrangement of its components for locking and driving the landing gear.

Figure 13:
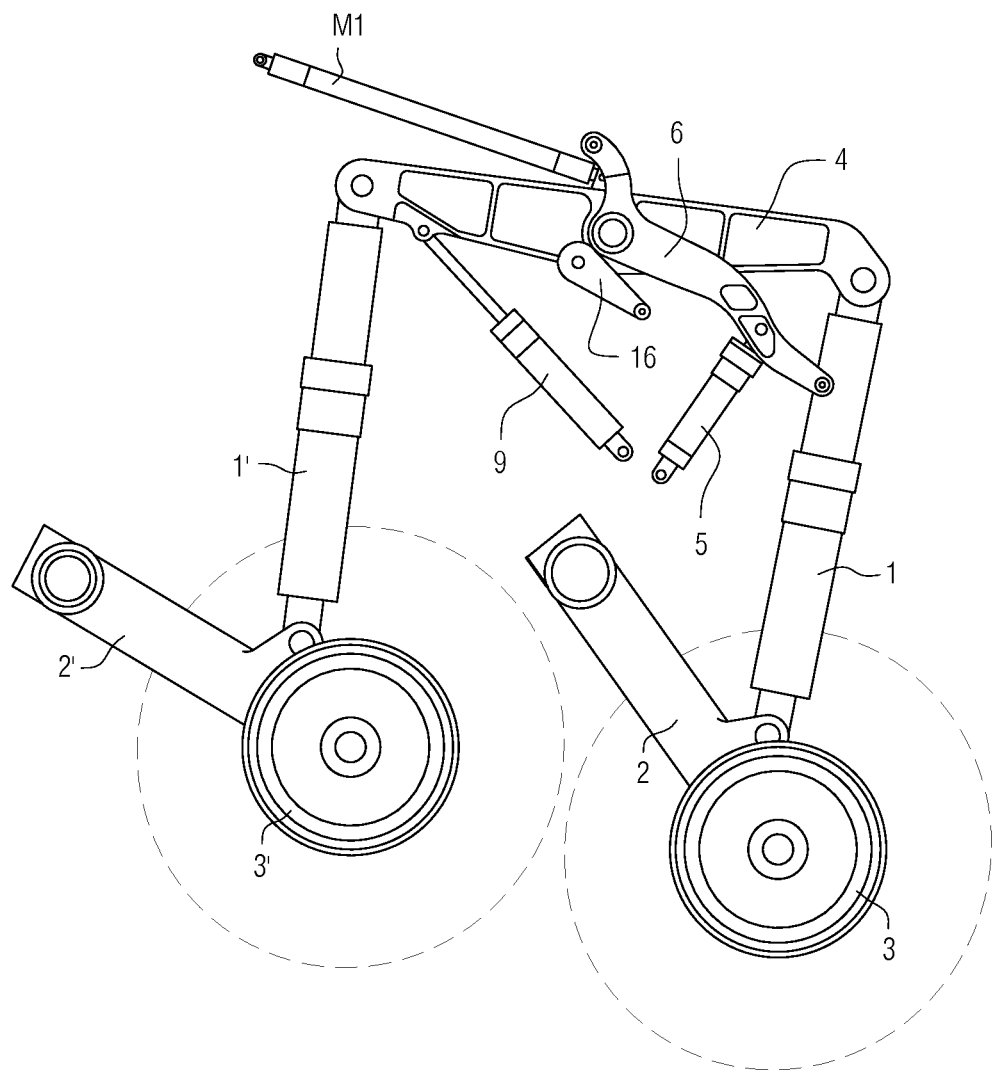
FIG. 13 shows an inverted side view of the extended landing gear of the fourth embodiment of the present invention comprising four wheels.
Figure 14:
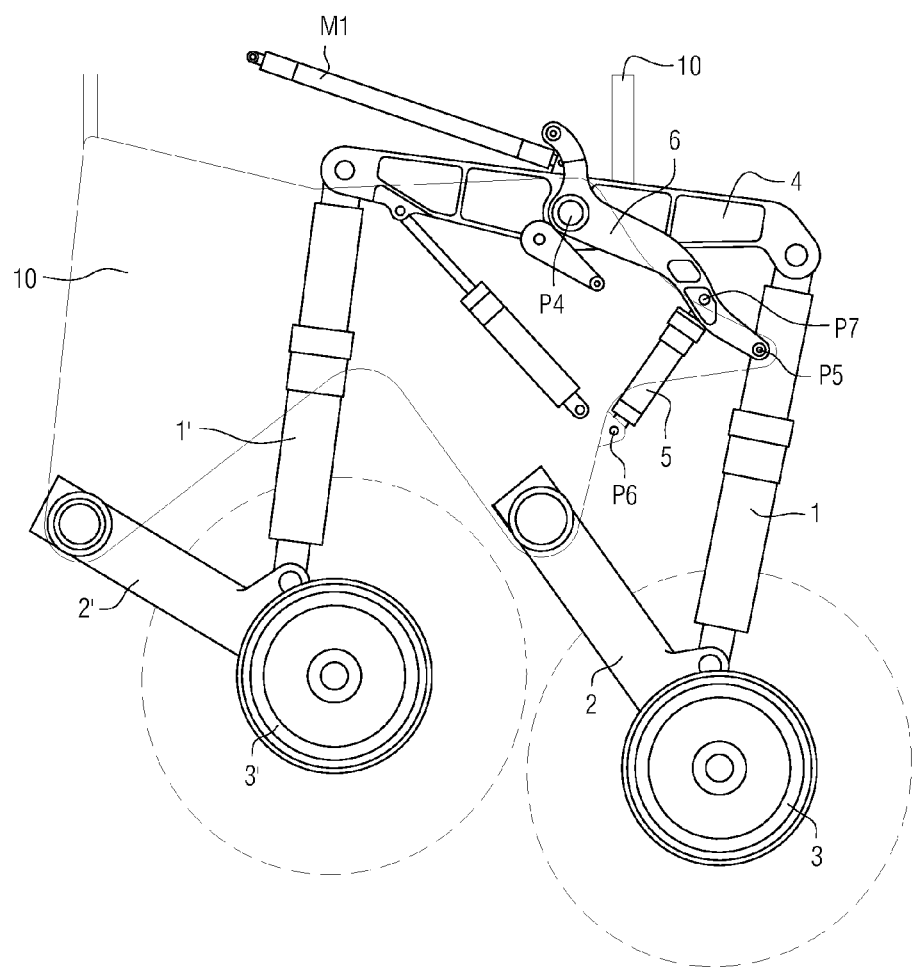
FIG. 14 shows an inverted side view of the extended landing gear, comprising four wheels and showing the aircraft structure, of the fourth embodiment of the present invention.

As in FIGS. 13 and 14, the landing gear includes in its central region the maneuvering actuator (5), whose second end is hingedly connected to the aircraft structure (10) at point P6 and its first end is hingedly connected to a portion of the retracting arm (6) at point P7, the second end of the retracting arm (6) being hingedly connected to the aircraft structure (10) at point P5. Another portion of the retracting arm (6) is hingedly connected to the balance beam (4) at the point P4.

With the landing gear in its extended position, its locking is made by a pin (17), which is hydraulically activated in the perpendicular direction to the balance beam (4). According to FIG. 15a, said pin (17) performs the locking between the balance beam (4) and the aircraft structure (10) at the point P4. In this position, said pin (17) provides the locking of the landing gear in the extended position by the locking performed between the balance beam (4) and the aircraft structure (10).

Figure 15A:
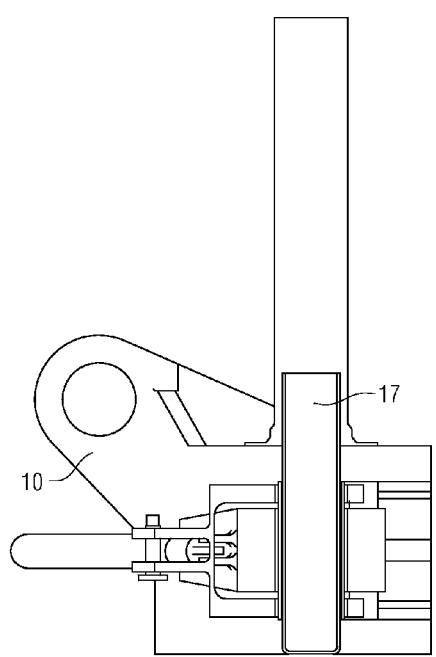
FIG. 15 shows the detail of the locking of the landing gear of the fourth embodiment of the present invention.
Figure 15B:
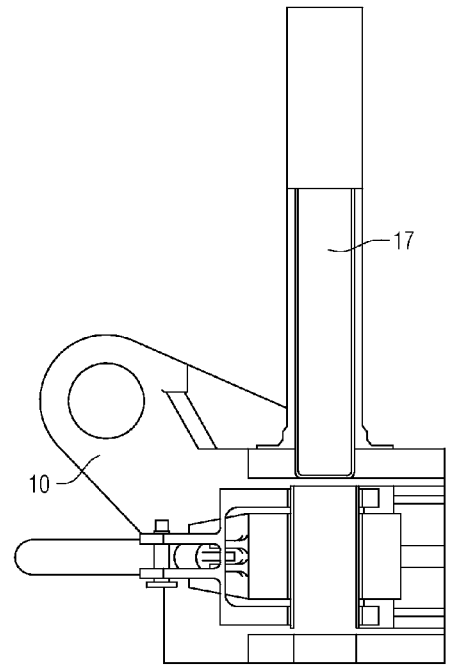

The landing gear at the retracted position shows the retracted pin (17), as in FIG. 15b. Thus, when the landing gear is to be retracted, the pin (17) is firstly hydraulically retracted, thereby releasing the movement of the set of elements of the landing gear. According to the FIGS. 16 and 17, such movement is performed from the maneuvering actuator (5) through the extension of its rod, which cases the whole assembly of elements of the landing gear to reach a synchronized movement until reaching the retracted position, which is shown in FIGS. 16 and 17.

Figure 16:
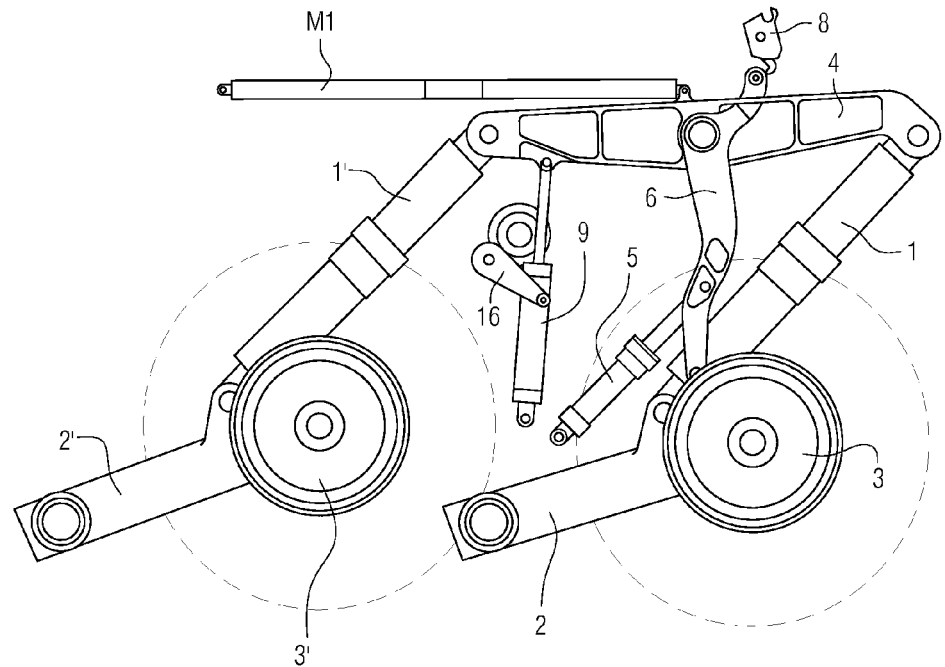
FIG. 16 shows an inverted side view of the retracted landing gear of the fourth embodiment of the present invention comprising four wheels.
Figure 17:
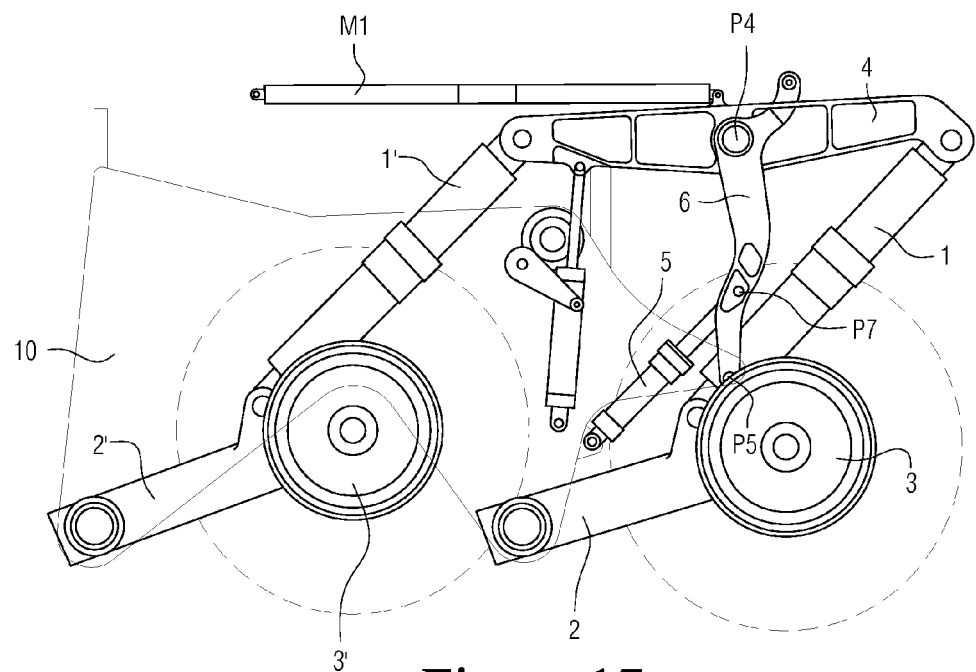
FIG. 17 shows an inverted side view of the retracted landing gear, comprising four wheels and showing the aircraft structure, of the fourth embodiment of the present invention.

According to FIG. 16, in the retracted position, the locking of the whole assembly is done by the coupling between the first end of the retracting arm (6) and the up lock box device (8).

Starting from the retracted position to the extended position, the movement is performed by the maneuvering actuator (5) through the retraction of its rod, thus causing a synchronized movement of the other components.

In the fourth embodiment, as well as in the third one, according to FIG. 10, the positioning damper element (9) has its second end hingedly connected to the aircraft structure (10) and its first end is hingedly connected to the arm (B1), which in turn is connected to the balance beam (4). According to FIG. 16, when the landing gear is in the retracted position, the shield (16) is positioned in front of the channel of the pin (17) through an automatic shifting, which is promoted by a torsion spring coupled to the same. The positioning of the shield (16) before the channel of the pin (17) aims to prevent the pin (17) to be extended as in FIG. 15a, when the landing gear is retracted.

Figure 18:
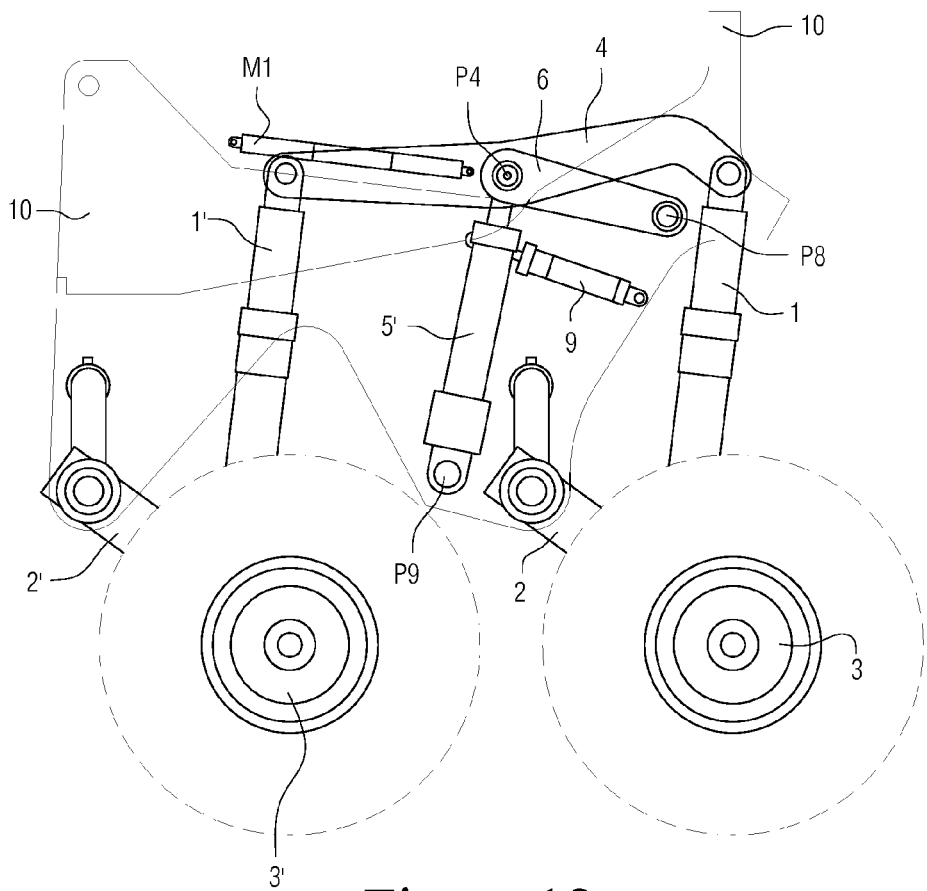
FIG. 18 shows an inverted side view of the extended landing gear, comprising four wheels and showing the aircraft structure, of the fifth embodiment of the present invention.
Figure 19:
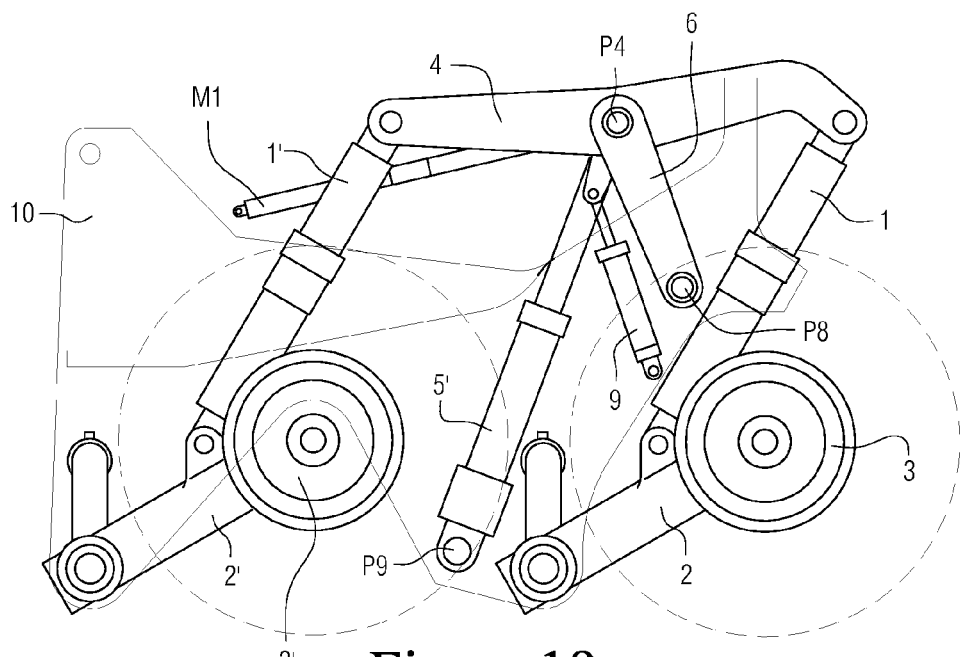
FIG. 19 shows an inverted side view of the retracted landing gear, comprising four wheels and showing the aircraft structure, of the fifth embodiment of the present invention.

FIGS. 18 and 19 show a fifth embodiment designed for the present invention. Said embodiment also comprises a first front sub-set formed by a connecting arm (2'), at least one wheel (3') and a shock absorber (1'), and a rear sub-set formed by a connecting arm (2), at least one wheel (3) and a shock absorber (1). These two sub-sets are connected by the balance beam (4). The elements of these sub-sets and the balance beam (4) are disposed in the same way as in the first embodiment of the present invention.

Its main feature is the arrangement of its components for locking and driving the landing gear. As in FIGS. 18 and 19, the landing gear includes in its central region the maneuvering actuator (5'), which comprises an internal lock or a self-blocking thread, whose second end is hingedly connected to the aircraft structure (10) at point P9 and its first end is hingedly connected to the balance beam (4) at point P4, the first end of the retracting arm (6) being hingedly connected to the balance beam (4) at point 24 and its second end being hingedly connected to the aircraft structure (10) at point 28.

The locking of the landing gear in the extended position is made by the maneuvering actuator (5'), which is internally equipped with a locking device, which may be a self-blocking thread or an inner lock.

According to FIG. 19, when retracting the landing gear, the maneuvering actuator (5') performs an extension movement for extending its rod, thus causing the movement of the whole set of the landing gear. The movement of this rod of the maneuvering actuator (5') allows the whole assembly of elements of the landing gear to carry out a synchronized movement to reach the retracted position.

According to FIG. 19, in the retracted position, the locking of the whole assembly is also done by the maneuvering actuator (5') itself.

Starting from the retracted position to the extended position, the movement is also performed by the maneuvering actuator (5') through the retraction of its rod, thereby causing a synchronized movement of the other components.

In the fifth embodiment, as well as in the third embodiment, according to FIG. 10, the positioning damper element (9) has its second end hingedly connected to the aircraft structure (10) and its first end is hingedly connected to the arm B1, which in turn is connected to the balance beam (4).

Figure 20:
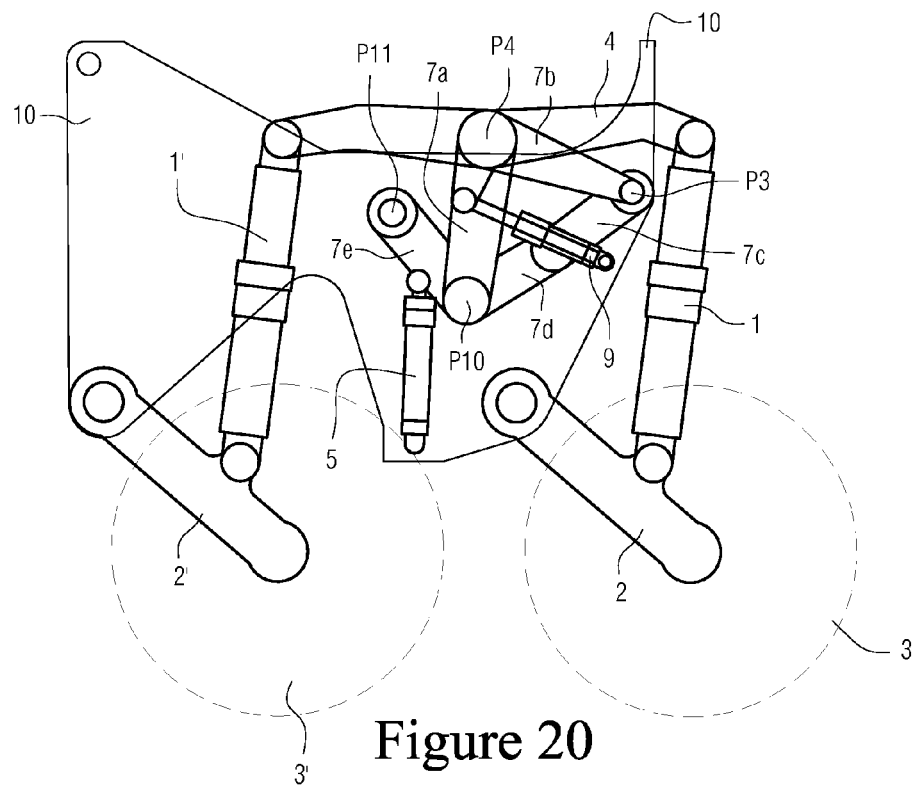
FIG. 20 shows an inverted side view of the extended landing gear, comprising four wheels and showing the aircraft structure, of the sixth embodiment of the present invention.
Figure 21:
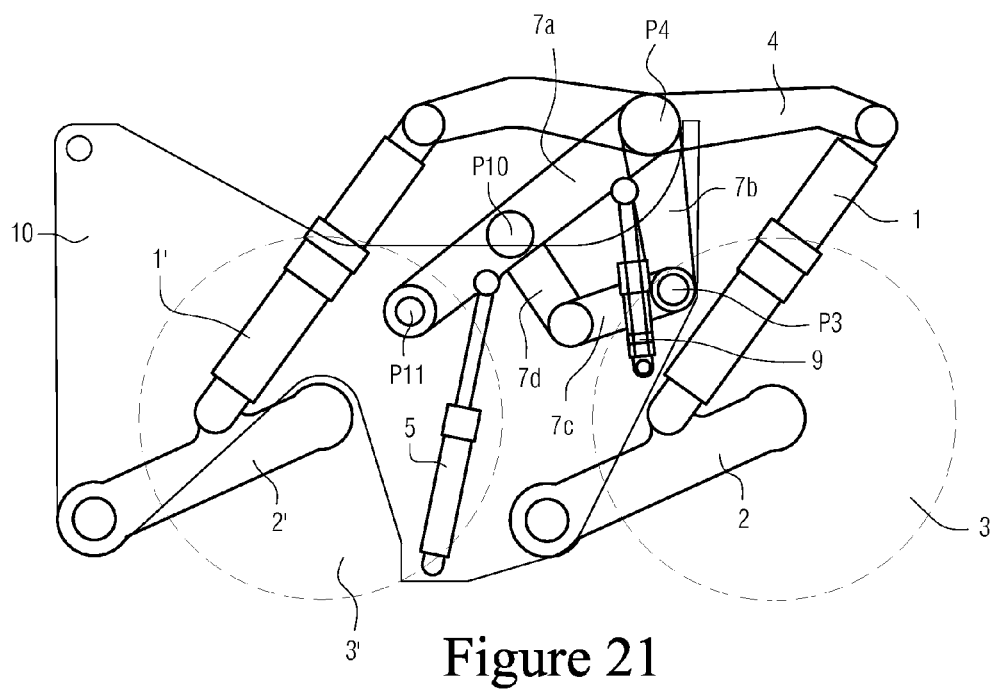
FIG. 21 shows an inverted side view of the retracted landing gear, comprising four wheels and showing the aircraft structure, of the sixth embodiment of the present invention.

FIGS. 20 and 21 show a sixth embodiment designed for the present invention. Said embodiment also comprises a first front sub-set formed by a connecting arm (2'), at least one wheel (3') and a shock absorber (1'), and a rear sub-set formed by a connecting arm (2), at least one wheel (3) and a shock absorber (1). These two sub-sets are connected by the balance beam (4). The elements of these sub-sets and the balance beam (4) are disposed in the same way as in the first embodiment of the present invention.

Its main feature is the arrangement of its components for locking and driving the landing gear. This arrangement is different from the previous ones, mainly the third embodiment, due to the arrangement of the semi-arms that are comprised by the locking arm (7), which will provide a force distribution between the semi-arms in a different manner between this embodiment and the third one.

According to FIG. 20, in the extended position the landing gear shows in its central region a locking arm (7) formed by the semi-arms (7a), (7b), (7c), (7d) and (7e), which are hinged to each other. At the time when the landing gear is in the extended position, said arms are disposed so that the first end of (7a) is angularly connected to the first end of (7b); the second end of (7b) is angularly connected to the first end of (7c); the second end of (7c) is connected in a straight and locked manner to the first end of (7d); the second end of (7d) is angularly connected to the second end of (7a). Moreover, at the connection point P10, there is simultaneously the hinged connection between the second end of the semi-arm (7d), the second end of the semi-arm (7a) and the second end of the semi-arm (7e). Even when the landing gear is in the extended position, as in FIG. 20, the semi-arm 7a is parallel to the shock absorbers 1 and 1', and the tilt of the semi-arm 7e, as in FIG. 20, relative to an imaginary line passing through the point P10 and parallel to the longitudinal axis of the balance beam 4 is between 90° and 180°.

According to FIG. 20, the first end of the semi-arm 7e is hingedly connected to the aircraft structure (10) at point P11. Similarly, at the connection point P3, there is simultaneously the hinged connection between the second end of the semi-arm (7b), the first end of the semi-arm (7c) and the aircraft structure (10).

In the connection point P4, there is simultaneously a hinged connection between the first end of the semi-arm (7a), the first end of the semi-arm (7b) and the center of the balance beam (4).

As it can be seen in FIGS. 20 and 21, the maneuvering actuator (5) has its first end hingedly connected to the semi-arm (7e) and its second end is hingedly connected to the aircraft structure (10).

In the sixth embodiment, as well as in the third embodiment, as shown in FIG. 10, the positioning damper element (9) has its second end hingedly connected to the aircraft structure (10) and its first end is hingedly connected to the arm (B1), which in turn is connected to the balance beam (4).

This embodiment further includes the unlocking actuator (13) and the unlocking arm (15). In order to initiate the retracting of the landing gear, the unlocking actuator is activated, which activates the unlocking arm, which in turn unlocks the existing locking due to the alignment between the semi-arms (7c) and (7d). Then, the maneuvering actuator (5) is activated causing the extension of its rod, which leads the whole assembly to achieve a synchronized movement until reaching the retracted position, which is shown in FIG. 21.

In the retracted position, the locking of the whole assembly is made by the alignment between the semi-arms (7e) and (7a), with the aid of a spring or other locking means.

Starting from the retracted position to the extended position, the movement is also performed by the maneuvering actuator (5) through the retraction of its rod, which causes a synchronized movement of the other components.

For a person skilled in the art, it will be obvious that many modifications and replacements may be made to the present invention as described, without departing from the spirit and scope of the same, as defined in the attached claims.

The invention claimed is:

1. A retractable landing gear mechanism for extended and retracted positions relative to an aircraft structure, wherein the landing gear mechanism comprises:
   at least front and rear wheels,
   at least front and rear connecting arms having one end operatively connected to the front and rear wheels, respectively, and an opposite end pivotally connected to aircraft structure;
   a balance beam element having front and rear end portions;
   front and rear shock absorbers having lower and upper ends, wherein the lower ends of the front and rear shock absorbers are pivotally connected to the one end of the front and rear connecting arms, respectively, and wherein the upper ends of the front and rear shock absorbers are connected pivotally to the front and rear end portions of the balance beam element at respective front and rear pivot points, wherein the balance beam is thereby indirectly linked to the front and rear wheels through each one of the front and rear connecting arms and each of the front and rear shock absorber elements, respectively; and
   a retracting arm having an upper end pivotally connected to the aircraft structure and a lower end pivotally connected to the balance beam element at an intermediate pivot point which is aligned with and equidistantly positioned between the front and rear pivot points.

2. The retractable landing gear mechanism according to claim 1, further comprising a gear up lock box, and wherein the front end portion of the balance beam element includes a coupling extension which couples with the gear up lock box when the landing gear mechanism is in a retracted position.

3. The retractable landing gear mechanism according to claim 1, further comprising a positioning damper element hingedly connected to the aircraft structure at an upper end thereof and to a portion of the balance beam element.

4. The retractable landing gear mechanism according to claim 1, further comprising a locking arm connected to the balance beam element, and a maneuvering actuator device connected to the locking arm.

5. The retractable landing gear mechanism according to claim 4, wherein one end of the maneuvering actuator device is hingedly connected to the aircraft structure.

6. The retractable landing gear mechanism according to claim 5, wherein the locking arm comprises upper and lower hinged semi-arms, and wherein an opposite end of the maneuvering actuator is pivotally connected to the upper semi-arm.

7. The retractable landing gear mechanism according to claim 6, further comprising a positioning damper element hingedly connected to the aircraft structure at one end thereof and to the balance beam element at an opposite end thereof.

8. The retractable landing gear mechanism according to claim 6, wherein a lower semi-arm of the locking arm and a lower end of the retracting arm are respectively internally and externally hinged to balance beam element.

9. The retractable landing gear mechanism according to claim 4, further comprising a locking arm comprised of at least upper and lower semi-arms joined to one another at a hinged connection to allow hinged movement of the locking arm in response to operation of the maneuvering actuator device, wherein the lower semi-arm is hingedly connected to the balance beam element at the intermediate pivot point and the upper semi-arm is hingedly connected to the aircraft structure.

10. The retractable landing gear mechanism according to claim 9, wherein the maneuvering actuator includes a moving rod which is pivotally connected to a central part of the upper semi-arm of the locking arm.

11. The retractable landing gear mechanism according to claim 9, wherein the locking arm comprises a locking spring for maintaining the locking arm in a locked position.

12. The retractable landing gear mechanism according to claim 1, further comprising a maneuvering actuator, front and rear bellcranks, and a connecting bar interconnecting the front and rear bellcranks and arranged below and parallel to the balance beam element, wherein the maneuvering actuator has a first hinged end which is connected to an upper part of the balance beam element, and a second hinged end connected to a top of a rear bellcrank.

13. The retractable landing gear mechanism according to claim 12, wherein the rear and front bellcranks are hingedly interconnected to the balance beam element and the rear and front shock absorbers, respectively.

14. The retractable landing gear mechanism according to claim 1, further comprising a locking arm which includes a plurality of hingedly interconnected semi-arms each having first and second opposite ends, wherein when the landing gear is in the extended position, the semi-arms are disposed so that a first end of a first semi-arm is angularly connected to a first end of a second semi-arm, a second end of the second semi-arm is angularly connected to a first end of a third semi-arm, a second end of the third semi-arm is connected so as to be in a straight and locked manner to a first end of a fourth semi-arm, and a second end of the fourth semi-arm is angularly connected to a second end of the first semi-arm.

15. The retractable landing gear mechanism according to claim 14, a spring to assist in the locking between the second end of the third semi-arm and the first end of the fourth semi-arms.

16. The retractable landing gear mechanism according to claim 14, wherein the second ends of the first and fourth semi-arms and a first end of a fifth semi-arm are hingedly connected to one another at a common hinge connection point P1, and wherein a second end of the fifth semi-arm is hingedly connected to the aircraft structure at a hinge connection point P2.

17. The retractable landing gear mechanism according to claim 16, wherein the second end of the second semi-arm and the first end of the third semi-arm are hinged to one another and to the aircraft structure at a common hinge connection point P3.

18. The retractable landing gear mechanism according to claim 16, further comprising a maneuvering actuator and a positioning damper element, wherein the maneuvering actuator has a first end thereof hingedly connected to the fifth semi-arm and a second end thereof hingedly connected to the aircraft structure, and wherein the positioning damper element has a second end thereof hingedly connected to the aircraft structure and a first end thereof hingedly connected to a sixth semi-arm which is connected to the balance beam element.

19. The retractable landing gear mechanism according to claim 16, wherein when the retractable landing gear mechanism is in the extended position thereof, a bisecting line beginning at a vertex formed by the first and second semi-arms is oriented parallel to the front and rear shock absorber elements, and wherein the fifth semi-arm is oriented relative to an imaginary line passing through the hinge point P1 and parallel to a longitudinal axis of the balance beam element at an angle between 270° and 360°.

20. The retractable landing gear mechanism according to claim 14, wherein the first end of the first semi-arm and the first end of the second semi-arm are hingedly connected to one another and to a center portion of the balance beam element at a common hinge connection point P4.

21. The retractable landing gear mechanism according to claim 1, wherein the upper and lower ends of the retracting arm are pivotally connected to the balance beam element and the aircraft structure at hinge points P4 and P5, respectively, and wherein the retractable landing gear mechanism further comprises a maneuvering actuator having a second end thereof hingedly connected to the aircraft structure at a hinge point P6, and a first end thereof hingedly connected to the retracting arm at a hinge point P7 located between the hinge points P4 and P5.

22. The retractable landing gear mechanism according to claim 21, further comprising a pin which is capable of being hydraulically driven in a direction perpendicular to the balance beam element.

23. The retractable landing gear mechanism according to claim 1, wherein the upper and lower ends of the retracting arm are pivotally connected to the balance beam element and the aircraft structure at hinge points P4 and P8, respectively, and wherein the retractable landing gear mechanism further comprises a maneuvering actuator which comprises an internal locking device, the maneuvering actuator having a second end thereof which is hingedly connected to the aircraft structure at a hinge point P9 and a first end is hingedly connected to the balance beam element at the hinge point P4.

24. The retractable landing gear mechanism according to claim 23, which further comprises a positioning damper element having a second end hingedly connected to the aircraft structure and a first end hingedly connected to an arm of the balance beam element.

25. The retractable landing gear mechanism according to claim 1, further comprising a locking element which includes a plurality of hingedly interconnected semi-arms each having first and second ends, and wherein the second ends of first and fourth semi-arms and a first end of a fifth semi-arm are hingedly connected to one another at a common hinge connection point P10, and wherein when the landing gear is in the extended position, the first semi-arm is parallel to the front and rear shock absorbers.

26. The retractable landing gear mechanism according to claim 25, wherein the first end of the fifth semi-arm is hingedly connected to the aircraft structure at the hinge connection point P11, and wherein the second end of the second semi-arm and the first end of the third semi-arm are hinged to the aircraft structure at a common hinge point P3.

27. The retractable landing gear mechanism according to claim 26, further comprising a maneuvering actuator having a first end thereof hingedly connected to the fifth semi-arm and a second end thereof hingedly connected to the aircraft structure.

* * * * *